No. 12,383 REISSUED AUG. 22, 1905.

N. S. McKINSEY & A. R. NELSON.

TELEPHONE SELECTIVE SYSTEM.

APPLICATION FILED AUG. 16, 1904.

4 SHEETS—SHEET 1.

Witnesses

K. Lockwood Nevins

E. Annis

Inventors

N. S. McKinsey

A. R. Nelson

By

F. M. Wright.

Attorney

No. 12,383. REISSUED AUG. 22, 1905.

N. S. McKINSEY & A. R. NELSON.

TELEPHONE SELECTIVE SYSTEM.

APPLICATION FILED AUG. 16, 1904.

4 SHEETS—SHEET 2.

Witnesses

H. Lockwood Herring

E. Annis.

Inventors

N. S. McKinsey

A. R. Nelson

By F. M. Wright,

Attorney

No. 12,383. REISSUED AUG. 22, 1905.

N. S. McKINSEY & A. R. NELSON.

TELEPHONE SELECTIVE SYSTEM.

APPLICATION FILED AUG. 16, 1904.

4 SHEETS—SHEET 3.

Witnesses

K. Lockwood Nevins

E. Annis

Inventors

N. S. McKinsey

A. R. Nelson

By F. M. Wright,

Attorney

No. 12,383. REISSUED AUG. 22, 1905.

N. S. McKINSEY & A. R. NELSON.

TELEPHONE SELECTIVE SYSTEM.

APPLICATION FILED AUG. 16, 1904.

4 SHEETS—SHEET 4.

Witnesses
K. Lockwood Nevins
E. Annis

Inventors
N. S. McKinsey
A. R. Nelson
By F. W. Wright,
Attorney

UNITED STATES PATENT OFFICE.

NOBLE S. McKINSEY AND ANTON R. NELSON, OF SUSANVILLE, CALIFORNIA.

TELEPHONE SELECTIVE SYSTEM.

No. 12,383. Specification of Reissued Letters Patent. Reissued Aug. 22, 1905.

Original No. 755,691, dated March 29, 1904. Application for reissue filed August 16, 1904. Serial No. 220,988.

*To all whom it may concern:*

Be it known that we, NOBLE S. McKINSEY and ANTON R. NELSON, citizens of the United States, residing at Susanville, in the county of Lassen and State of California, have invented certain new and useful Improvements in Telephone Selective Systems, of which the following is a specification.

Our invention relates to telephone selective systems, the object of our invention being to provide a system by means of which any telephone can be selectively thrown on, rung up, and thrown off, one which shall be adapted for party and toll lines, for exchange-switchboards, for exchange-lines, for intercommunicating lines, for hotel drops and boards, and which in fact shall be applicable on any lines where telephones are used.

Our invention therefore resides in the novel construction, combination, and arrangement of parts for the above ends hereinafter fully specified, and particularly pointed out in the claims.

Figure 1:
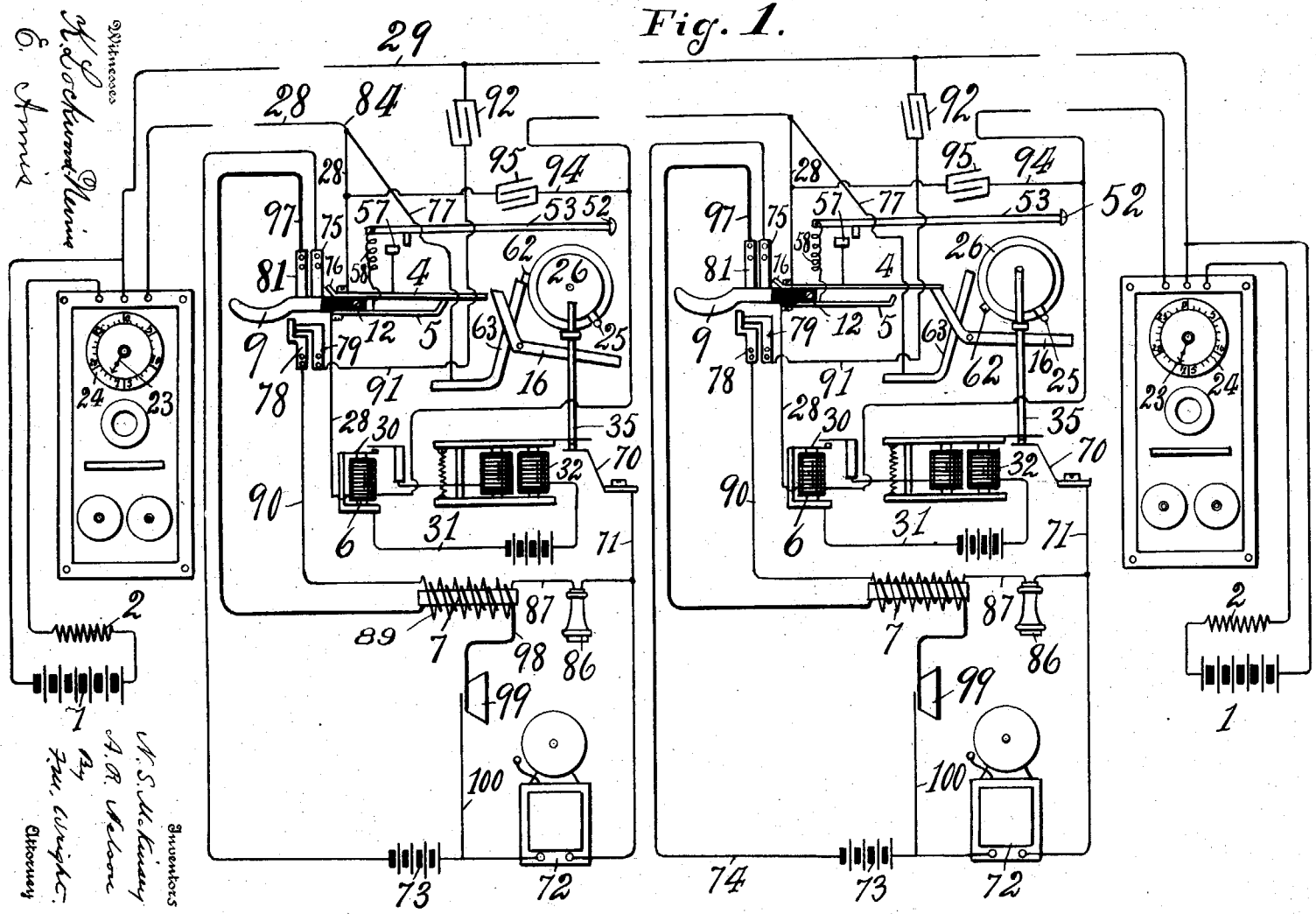
Figure 2:
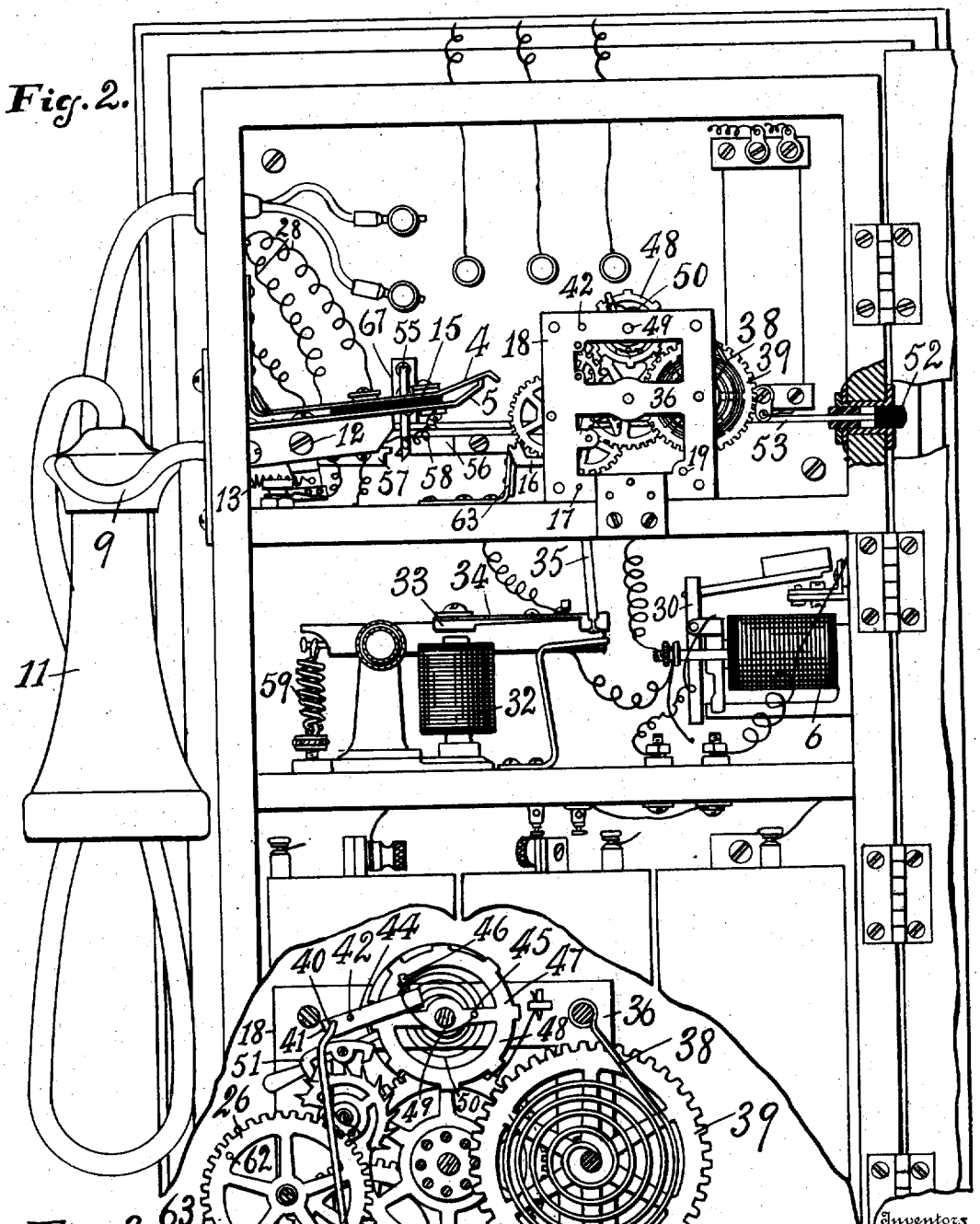
Figure 3:
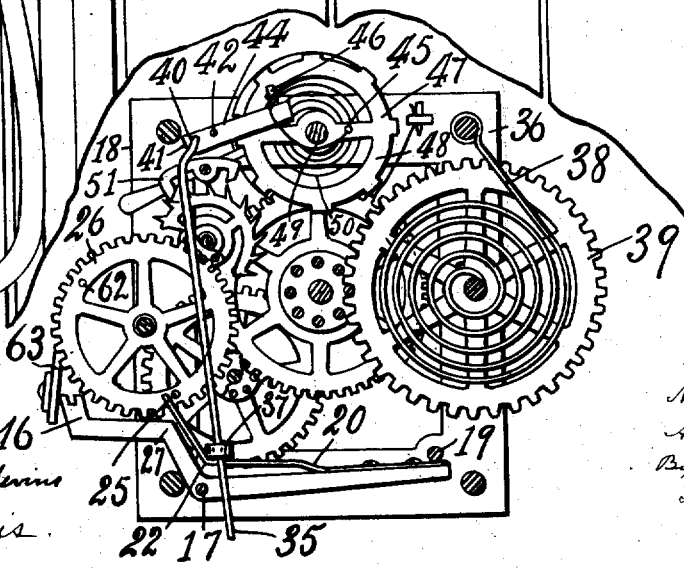
Figure 5:
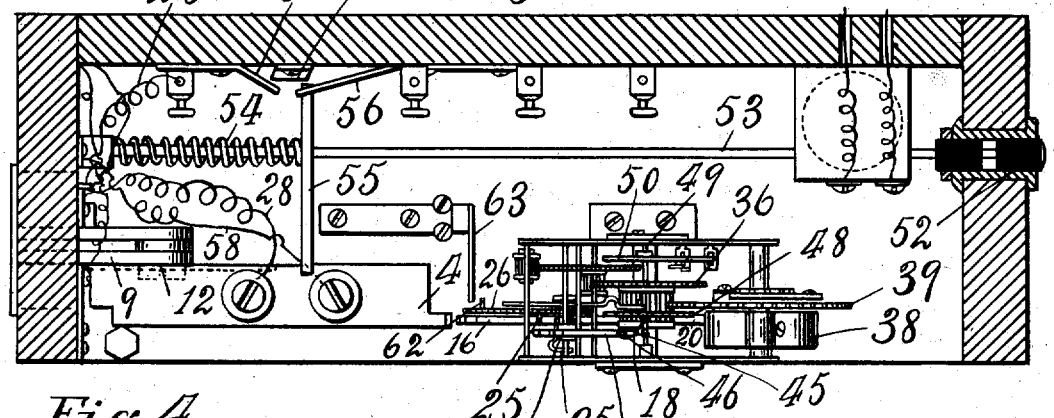
Figure 4:
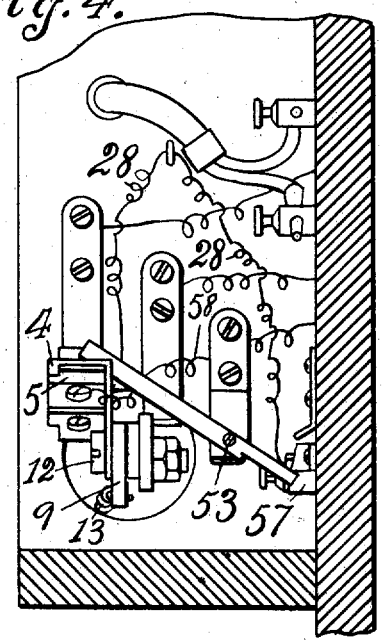
Figure 6:
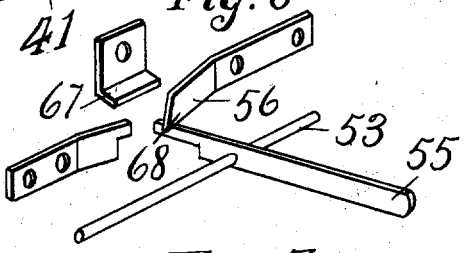
Figure 7:
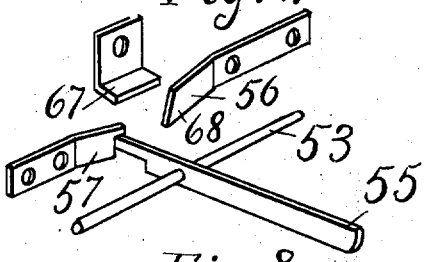
Figure 8:
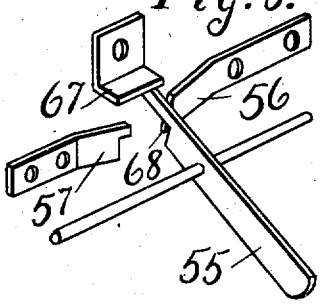
Figure 9:
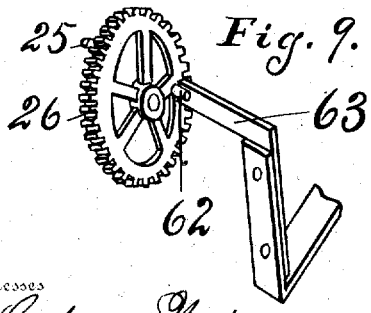
Figure 10:
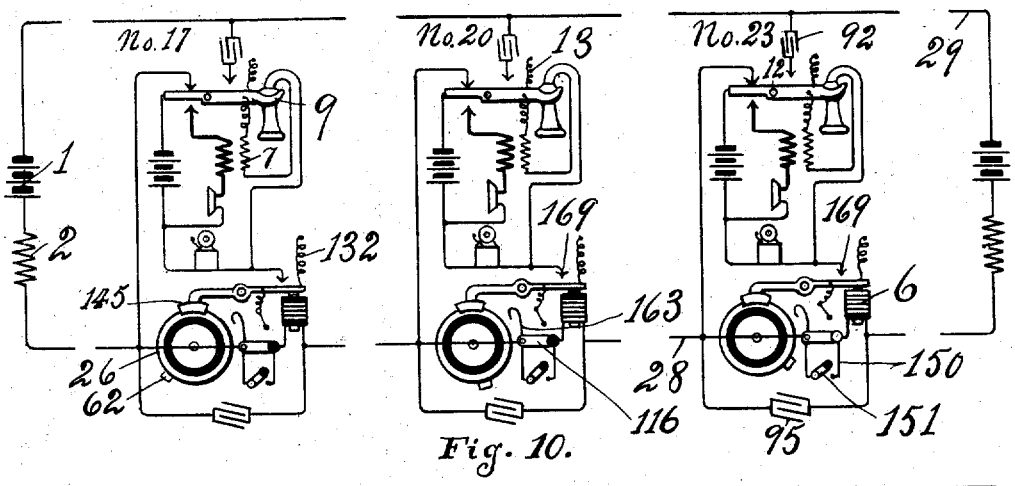
Figure 11:
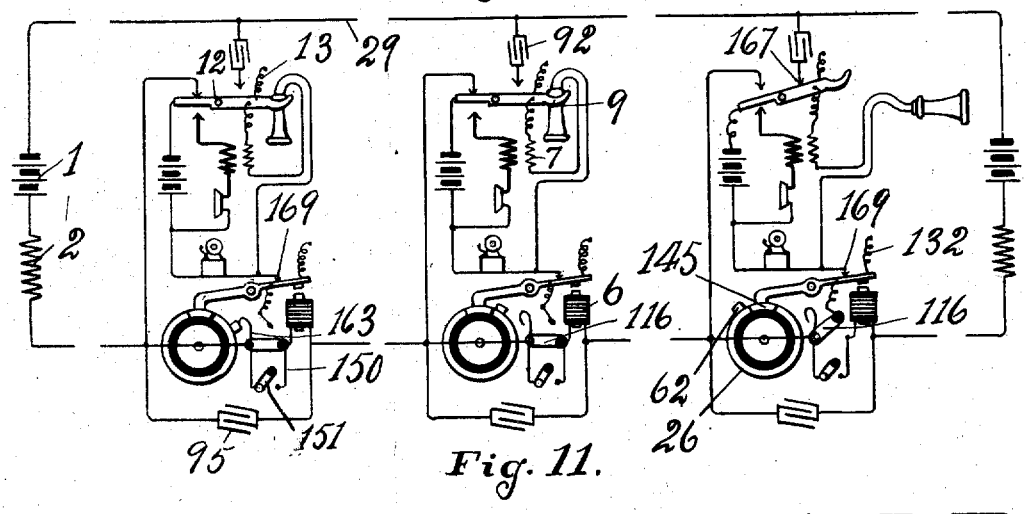
Figure 12:
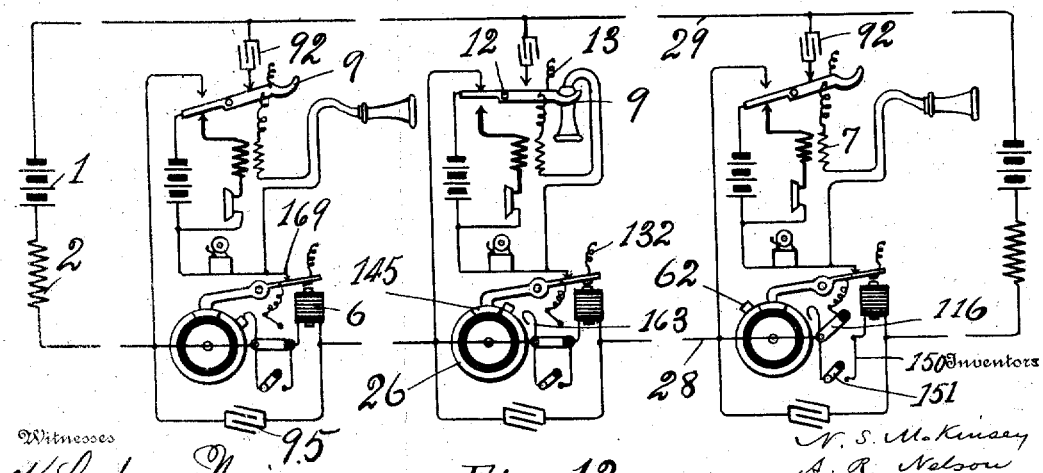

In the accompanying drawings, Figure 1 is a diagrammatic view of the system, showing the circuits of two of the telephones in talking communication. Fig. 2 is a front view of a telephone of the system, parts being broken away. Fig. 3 is an enlarged front view of the clockwork, the front part of its frame being removed. Fig. 4 is a vertical section of the upper portion of the telephone. Fig. 5 is a horizontal section of the same. Fig. 6 is a detail perspective view of the switch and resetting mechanism for the push-rod. Figs. 7 and 8 show the same in other positions. Fig. 9 is a similar view of the contact-wheel and spring-standard therefor. Fig. 10 is a view of the system, showing the connections of three other telephones in their simplest form. Fig. 11 is a similar view showing the arrangement of the circuits when the telephone on the right is being used to ring up the one on the left. Fig. 12 is a similar view when the telephones on the right and left are in talking communication.

The system here shown is supposed to be for a line of twenty-nine subscribers, although the system is adaptable for any number within reasonable limits, the mechanism of each telephone in the system being the same. For the sake of illustration, in Fig. 1 the telephones of Nos. 1, 17, 23, 29 are shown, the mechanisms of the telephones of subscribers Nos. 17 and 23 being shown diagrammatically in detail and the other telephones of the line being omitted. At each end of the line is a main battery 1 and a resistance-coil 2. At each telephone the main line passes only between contact-springs 4 5, which can be opened only by the removal of the signaler's ear-phone from the hook and then around a relay-magnet 6, it then proceeding to the next telephone. Neither the secondary coil 7 nor the call-bell nor any other part of the connections of each telephone is normally included in the main circuit. The only parts of each telephone that are included in the main circuit are the two normally closed contact-springs attached to the lever 9, which carries the ear-phone and the main relay. A metallic circuit is here shown; but it is evident that for the return-line 29 the earth may be substituted.

Let us now suppose that subscriber No. 23 desires to call up subscriber No. 17. He takes his ear-phone 11 from the hook or lever 9, which is pivoted at 12 and is raised by a spring 13. (See Fig. 2.) The right-hand end of said lever is thus depressed under the action of said spring 13. It is on this end of the hook or lever 9 that the upper and lower contact-springs 4 5 are carried, separated by insulating material 15, the upper spring 4 projecting beyond the lower, 5, as shown. By the removal of the ear-phone from the hook the spring 4 is thus brought into contact with the end of a line-controller or lever 16, pivoted on a shaft 17, mounted in a frame 18. The other end of said lever 16 is limited as to its upward movement by a stop 19. A flat spring 20 is secured at one end upon the top of the lever 16 and extends above and along said lever at a slight distance therefrom and is then bent upward at a point substantially above the shaft 17, as shown at 22. In the normal position of rest, when all the indicators 23 are at zero on the dial-plates 24, the zero-pins 25 on contact-wheels 26 are pressing against the ends of the springs 20, which again rest against shoulders or bends 27 on the levers 16 and are thus holding the ends of said levers as far to the left as possible. In this position, therefore, the aforesaid downward movement of the right-hand side of the hook-lever 9 brings the spring 4 into contact with the end of the lever 16, and since the downward movement of the said lever 16 is prevented by the abutment of its other right-hand end against the stop 19 said lever 16 presses the spring 4 from the spring 5, thus opening the main circuit.

It being understood that the act of the signaling party in taking down the ear-phone makes a break in the main circuit, we will now explain how it is provided that no other break can be made in the main line except this one in the telephone mechanism of the signaling party and how, consequently, the signaling party alone can introduce on the main line at this break therein his local telephone-bridge.

The opening of the main circuit causes the armature 30 of the main relay 6 to open, thus closing the circuit 31 of a magnet 32. The effect of closing this circuit is to draw down its armature 33, having a plate 34, to which is attached a rod 35, extending upward to the clockwork mechanism 36. Said rod has a lug 37 secured thereon, which extends over the lever 16 to the right of its pivot and also over the spring 20 on said lever, and therefore the descent of said rod also presses down said spring 20 and withdraws its end from engagement with the zero-pin on the contact-wheel. Said zero-pin is thus free to move past said spring, which it immediately does under the impulsive force of the mainspring 38, connected to the contact-wheel by a train of gearing 39. It is immediately arrested, however, by a further contrivance operated by said rod. The upper end of said rod is connected with a short arm 40 of a lever 41, pivoted on a shaft 42, mounted in the clockwork-frame 18, the long arm 44 of said lever having a thread 45, secured to a pin 46 upon said long arm and passing under the shaft 49, the other end of said thread being attached to a spoke 47 of the balance-wheel 48, mounted on the shaft 49 of a hair-spring 50, which controls the escapement 51. The effect, therefore, of the downward movement of the rod is to permit the contact-wheel to advance a minute distance, carrying the zero-pin past the end of the spring 20, and to hold it in this position so long as the long arm of the lever is raised. Subscriber No. 23 will now press a button 52 on the right of the telephone-case, said button being at the end of a rod 53, sliding transversely of the case, said rod being normally pressed in the direction of the button by means of a spring 54. Said rod carries a beam 55, which when the rod is moved to the left is released from a latch 56 and is brought into contact with a contact-spring 57, secured upon the rear wall of the telephone-casing. The rod 53 is connected by a wire 58 with the lower spring 5 of the telephone-hook, while the contact-spring 57 is connected with the upper spring 4. The effect, therefore, of pressing the rod 53 to the left is to close the circuit between said upper and lower springs—that is, to close the main circuit. Through the main relay this opens the circuit of the magnet 32, and the rod 35 then again moves upward under the action of the spring 59, which controls the armature 33 of said magnet. The effect of said upward movement of the rod is to permit the long arm of the lever 41 to drop, which allows the thread 45 to hang freely therefrom and permits the balance-wheel to oscillate, so that the clockwork is again set in motion. The contact-wheel now begins to revolve from its position just past the zero. All the other contact-wheels of the system likewise revolve synchronously therewith, for this is determined by the opening and closing of the main line. On the rear of each contact-wheel is set a contact-pin 62, the position of which with reference to the zero-pin varies according to the number of the subscriber; but the pins of all the contact-wheels are set at different angular distances from said zero-pin. As therefore the series of contact-wheels revolve one after the other of these contact-pins 62 comes into contact with a spring-standard 63, mounted upon the corresponding telephone-casing. Thus, supposing that the contact-pin for telephone No. 1 is set at one-thirtieth of the circumference from the zero-pin, the contact-pin for subscriber No. 2 at two-thirtieths, for subscriber No. 3 three-thirtieths, and so on, it is evident that after the contact-wheels have all revolved through one-thirtieth of a revolution the contact-pin 62 of telephone No. 1 will be in contact with the spring-standard 63 of that telephone. After all the contact-wheels have revolved through two-thirtieths of a revolution the contact-pin 62 of telephone No. 2 will be in contact with its spring-standard. After they have all revolved through three-thirtieths of a revolution the contact-pin 62 of telephone No. 3 will make contact with its spring-standard. The indicator on the dial shows the signaling party when the contact-pin arrives at the spring-standard of the party he desires to call—No. 17 in this case, according to supposition. As soon as this contact has been made, as indicated by the indicator 23 on the dial 24, the signaling party releases the button. The rod 53 then moves to the right under the action of the spring 54, and since this spring is given a sufficient torsion to turn the rod the rear end of the beam 55 is thrown upward as the rod moves to the right, which brings said rear end against a stop 67. Against this it rests until the right side of the hook-lever rises, owing to the signaler hanging up his ear-phone, which causes the rear end of the beam 55 to drop along the sloping end 68 of a latch 56 and rest under said latch until the button is again pressed. The movement of the rod to the right breaks the main circuit, and therefore, as already explained, closes the circuit of the magnet 32 and again arrests the clockwork. The contact-pin 62 of subscriber No. 17's telephone alone is in contact with the corresponding spring-standard. The consequence is that a local circuit is closed in the telephone of subscriber No. 17 and of no other subscriber, which circuit is used to ring the call-bell. This circuit is as follows: Starting from the contact-pin 62 the circuit passes through the contact-wheel and along the rod 35 to a contact-spring 70, wire 71, bell 72, local battery 73, wire 74, spring-contact 75, spring-contact 76, main wire 28, wire 77, spring-standard 63. As soon as subscriber No. 17 takes his ear-phone off the hook this opens the circuit between the two spring-contacts 75 and 76, causing the bell to cease ringing. It also permits the closure of spring-contacts 78 79 in the talking-circuit, and it closes the spring-contacts 75 81 in the primary transmitter-circuit. The ear-phone of subscriber No. 17 will now be on a bridge between the main line 28 and the return-wire 29, said bridge having a condenser. Said bridge is as follows: from the main wire at the point 84 along a wire 77 to the spring-standard 63, contact-pin 62, wheel 26, rod 35, contact-spring 70, wire 71, receiver 86, wire 87, secondary winding of the induction-coil 89, wire 90, contacts 78 79, wire 91, condenser 92 to the return-wire. The ear-phone of the party signaling is also on a bridge between the main and return wires, as follows: leaving the main wire at the spring-contact 4, lever 16, rod 35, contact-spring 70, wire 71, receiver 86, wire 87, secondary winding of the induction-coil 89, wire 90, contacts 78 79, wire 91, condenser 92 to the return-wire. By this means a talking-circuit is completed. Shunt-wires 94, however, containing condensers 95, are introduced at each telephone, shunting that portion of the main line which passes around the magnets of the main relay. It is obvious that the primary circuits of the transmitters are closed by the removal of the ear-phone and the closure of the spring-contacts 75 81. This circuit is battery 73, wire 74, contacts 75 81, wire 97, primary winding of the induction-coil 89, wire 98, transmitter 99, wire 100. It is obvious that no other subscriber can communicate in this way, because in the telephone of no other subscriber is the contact-point in the same relative position to the spring-standard, those of the earlier numbers having already passed the spring-standard and those of the later numbers not having reached it. It is only when the contact-wheel is at zero position that spring-contact 4 can come into contact with the end of the lever 16 and open the main circuit, because only when it is at zero position the zero-pins are pressing against the levers 16 and are holding the left-hand ends of said levers to the left as far as possible—sufficiently far for the ends of the descending spring-plates 4 to make contact; but as soon as the zero-pins are released from the levers 16, so that the levers other than that of the signaling party can assume their normal position under gravity, the left-hand ends of said levers move upward and to the right, and thereby escape the ends of the spring-contacts 4 should any of the latter descend by reason of any subscriber removing his ear-phone from the hook. It is thus evident that it is practically impossible for two subscribers on the circuit to obtain control of the talking-circuit at the same time by taking their ear-phones off the hook, for if there is a difference of the smallest interval of time in doing so the first subscriber will open the main circuit and will draw down the springs 20 of all the telephones, releasing the levers 16 of all the other telephones.

The impossibility of more than two phones being on the line at the same time will appear clearly from the fact that a phone can be brought onto the line in one of two ways only—either by a connection through the contact-pin 62 and spring-standard 63, which brings the called subscriber onto the line, or by a connection between the lever 16 and spring-contact 4, which brings the caller's telephone onto the line. Only one telephone can satisfy the former condition, because the contact-wheels all revolving simultaneously and starting from zero and the contact-pins being set at different angular positions for all the subscribers no two subscribers can have their contact-pins completing the circuit at the same time. Only one telephone can satisfy the latter condition, because the instant that any subscriber takes his ear-phone off the hook after the contact-wheel has reached zero-point it is rendered impossible for all the other subscribers to close their circuit through the hook-lever and the lever 16. This also renders it impossible for there to be any eavesdropping or interruption on the line.

The main steps in the operation of our improved system are seen to be as follows: The removal of the caller's ear-phone from its hook breaks the main circuit. The breaking of the main circuit causes synchronously-moving contact-changers (of which there is one at each station) to advance a short distance, thereby preventing the breaking of the main circuit by the removal of any other ear-phone in like manner as the first; but said breaking of the main circuit immediately afterward arrests said contact-changers. They are now all started again by the closing of the main circuit by the calling subscriber. Said changers partly close in succession and exclusively the bell-circuits and also the talking-circuits at the remaining stations. The breaking of the main circuit at any time then completely closes the bell-circuit which was at that instant partly closed and, further, partly closes the corresponding talking-circuit, the contact-changers being then of course arrested. The removal of the called subscriber's ear-phone from its hook then breaks his own bell-circuit and closes his talking-circuit and also his primary transmitter-circuit and enables him to talk to the calling subscriber.

The relation of the circuits will be best followed by reference to the diagrams shown in Figs. 10 to 12. Fig. 10 shows in their simplest form the circuits in the normal condition of the system when no telephone is being used. Fig. 11 shows the circuits when subscriber No. 23 has signaled to subscriber No. 17 and the bell is ringing, but subscriber No. 17 has not removed his ear-phone from the hook. Fig. 12 shows the circuits when subscribers Nos. 23 and 17 are talking. In these diagrams a spring 132 has been substituted for the electromagnet 32, operated by the main relay, the effect being the same in character and the electromagnet only being used to increase the power without unduly increasing the resistance through the main relay. The mechanical means for stopping the contact-wheel are now diagrammatically represented by the brake 145. The push-button and rod for closing the main circuit through a loop-line are now represented diagrammatically by the loop-line 150 and switch 151. The contact-pin 62 on the contact-wheel 26 is shown, and the spring-standard is represented at 163; but the connection through the lever 16 is represented diagrammatically by the switch 116, which, it will be observed, can simultaneously open the main line and connect the main line with the bridge through the receiver and secondary winding. The bridge arrangement of said receiver and secondary winding between the main wire and the return-wire or earth is also more obvious in these diagrams. It will now readily be seen that before the system is operated this bridge, containing the receiver and secondary winding and extending between the main and return wires, contains three breaks. All of these are closed immediately in the bridge of the signaling party when said signaling party removes his ear-phone from the hook, the first break 167 being closed by the upward movement of the left-hand side of the hook, permitting the two spring-contacts 78 and 79 to come together. The second break (represented in said diagrams by the switch 116) is also closed by the spring-contact 4 touching the lever 16, and the third break (169 in said diagrams) is closed by the opening of the main circuit, this corresponding to the depression of the rod 35 upon the spring-contact 70. This brings the signaling party's telephone onto a closed bridge between the main and return wires, providing also a break in the main wire, which he can close or open once at will by means of the loop-line 150 and switch 151 therein, corresponding to the push-rod 53 and contact-spring 57. It has not been attempted in these diagrams to illustrate the mechanical means whereby when one of the switches 116 has been opened all of the other switches 116 of the series are locked closed. Bearing in mind this fact, however, it will readily be seen how the signaling party has control of the line, for as to the other bridges on the line, while the breaks 169 have now all been closed and the break 167 can easily be closed by any party taking his ear-phone from the hook, the third break cannot be closed by the switch 116. If it is to be closed at all, it can only be done by means of the contact-wheel and contact-pin. To close it by this means, the contact-wheels must advance and must stop at a predetermined point. They cannot do this without opening and closing the main line, and the only party who has power to do this is the signaling party, who has a break in the main line which he can open and close once at pleasure.

It will readily be observed that the bell-circuit of every telephone is a local circuit having two breaks therein. One of these, 169, is closed by any break in the main line, and the other—that between the contact-pin and spring-standard—is closed when the individual contact-pin arrives at the spring-standard. These latter closures are made in succession in the several telephones of the series, and when the closure is being made at the telephone of the party desired to be signaled the signaling party opens the main line, and thereby closes all the first series of breaks 169 in all of the local circuits, the result being that only in the one desired is there a completely-closed local circuit.

When the signaled party removes his ear-phone the bell-circuit is broken, and there are closed a local primary transmitter-circuit and a bridge, (the third closure of which, that at 167, is thus made between the main and return wires,) this bridge containing the receiver and the secondary winding of the induction-coil.

The line is under the full control of the party signaling. The party signaled remains on the line until thrown off by the party signaling. Should the party signaled hang up his ear-phone, he will again bring the spring-contacts 75 76 into contact, which will complete the signaling-circuit. Should, however, one party after talking with another try to talk with a third party still holding the line, he will find that he cannot do this, but will have to wait until the indicator returns to zero and will then take his chance on being the first to take down the ear-phone after the indicator arrives at zero. The reason for this is that he cannot talk to another party without the contact-pin of said other party making contact with its spring-standard. To do this, the contact-wheels must all advance. They will not advance so long as the main line is open; but the signaling party cannot again close the main circuit by pushing the button, because the rear end of the beam 55, which makes the contact, is now above the plane of the contact-spring 57 and will not touch it when the push-button is pressed. It will only do so when reset under the latch 56, and this it will only do when the signaling party hangs up his phone. As soon as the signaling party hangs up his ear-phone the contact-wheels advance; but he cannot by taking his telephone off the hook produce a contact between the spring-contact 4 and lever 16, because the lever 16 has risen out of the way of said spring-contact.

The following advantages may also be noted: In this system an unlimited number of phones can be placed on one wire, the contact-wheels being made of sufficient size. Telephones can be placed anywhere on the line regardless of consecutive order, nor is it necessary that the angular order of the contact-pins on the contact-wheels should follow the order on the line of the corresponding telephones. There is no limit to the number of miles of length of the system, provided sufficient battery is used to actuate the main-line relays. The mechanism may be regarded as self-regulating, since it always returns to zero and there stops, ready for further use by another caller. The mechanism requires no attention and will readily run for sixty days with one winding of the mainspring and can be made to run for two years or more by giving the mainspring the proper length. The system is cheap as to wiring, since only a single grounded wire or a single metallic circuit is used. Only two condensers are used with each telephone mechanism. There will never be any dispute as to who is the first to get the line, as the mechanism itself would always determine that. Each piece of mechanism at each station is independent of all the others, and should it get out of order and refuse to operate it does not affect any other on the line, but simply cuts itself out and will not respond to impulses. This is so, because the only parts of the mechanism which are on the line are the two spring-contacts carried by the hook-lever and the wire through the main relay.

We claim—

1. In a telephone system, the combination of a main wire having a switch at each telephone-station, a return-wire, a bridge at each telephone-station between the main and return wires having therein the secondary winding and ear-phone, a break closed by the opening of the main line, and a second break closed by a revolving device, the revolution thereof being controlled by the opening and closing of the main line, only one of said devices making said closure at a time, substantially as described.

2. In a telephone system, the combination of a main wire having a switch at each telephone-station, a return-wire, a bridge at each telephone-station between the main and return wires having therein the secondary winding and ear-phone, a break closed by the opening of the main line, and a second break closed by a revolving device, the revolution thereof being controlled by the opening and closing of the main line, only one of said devices making said closure at a time, and means independent of said opening and closing for impelling said device, substantially as described.

3. In a telephone system, the combination of a main wire having a switch at each telephone-station, a return-wire, a bridge at each telephone-station between the main and return wires having therein the secondary winding and ear-phone, a break closed by the opening of the main line, and a second break closed by a revolving device, the revolution thereof being controlled by the opening and closing of the main line, said devices all moving in unison but making their closures in succession, substantially as described.

4. In a telephone system, the combination of a main wire having a switch at each telephone-station, a return-wire, a bridge at each telephone-station between the main and return wires having therein the secondary winding and ear-phone, a break closed by the opening of the main line, and a second break closed by a revolving device, the revolution thereof being controlled by the opening and closing of the main line, said devices all moving in unison but making their closures in succession, and means independent of said opening and closing for impelling each device, substantially as described.

5. In a telephone system, the combination of a main wire having a switch at each telephone-station, a shunt around said switch and a switch in said shunt, a return-wire, a bridge at each telephone-station between the main and return wires having therein the secondary winding and ear-phone, a break closed by the opening of the main line, and a second break closed by a revolving device, the revolution thereof being controlled by the opening and closing of the main line, only one of said devices making said closure at a time, substantially as described.

6. In a telephone system, the combination of a main wire having a switch at each telephone-station, a shunt around said switch and a switch in said shunt, a return-wire, a bridge at each telephone-station between the main and return wires having therein the secondary winding and ear-phone, a break closed by the opening of the main line, and a second break closed by a revolving device, the revolution thereof being controlled by the opening and closing of the main line, only one of said devices making said closure at a time, and means independent of said opening and closing for impelling said device, substantially as described.

7. In a telephone system, the combination of a main wire having a switch at each telephone-station, a shunt around said switch and a switch in said shunt, a return-wire, a bridge at each telephone-station between the main and return wires having therein the secondary winding and ear-phone, a break closed by the opening of the main line, and a second break closed by a revolving device, the revolution thereof being controlled by the opening and closing of the main line, said devices all moving in unison but making their closures in succession, substantially as described.

8. In a telephone system, the combination of a main wire having a switch at each telephone-station, a shunt around said switch and a switch in said shunt, a return-wire, a bridge at each telephone-station between the main and return wires having therein the secondary winding and ear-phone, a break closed by the opening of the main line, and a second break closed by a revolving device, the revolution thereof being controlled by the opening and closing of the main line, said devices all moving in unison but making their closures in succession, and means independent of said opening and closing for impelling each device, substantially as described.

9. In a telephone system, the combination of a main wire having a switch at each telephone-station, a return-wire, a bridge at each telephone-station between the main and return wires having therein the secondary winding and ear-phone, a break closed by the opening of the main line, and a second break and two closures for said break, one of said closures being made by a revolving wheel, all of said wheels moving in unison but closing in succession and the other being made by means of an independent switch, substantially as described.

10. In a telephone system, the combination of a main wire having a switch at each telephone-station, a return-wire, a bridge at each telephone-station, a return-wire, a bridge at each telephone-station between the main and return wires having therein the secondary winding and ear-phone, a break closed by the opening of the main line, and a second break and two closures for said break, one of said closures being made by a revolving wheel, only one of such closures being operatable at a time for all the wheels and the second closure being made by an independent switch, substantially as described.

11. In a telephone system, the combination of a main wire having a switch at each telephone-station, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line and the second closure being made by an independent switch, substantially as described.

12. In a telephone system, the combination of a main wire having a switch at each telephone-station, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, means independent of said opening and closing for impelling said wheel, and the second closure being made by an independent switch, substantially as described.

13. In a telephone system, the combination of a main wire having a switch at each telephone-station, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, only one of said wheels making a closure at a time, and the second closure being made by an independent switch, substantially as described.

14. In a telephone system, the combination of a main wire having a switch at each telephone-station, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, means independent of said opening and closing for impelling said wheel, only one of said wheels making a closure at a time, and the second closure being by an independent switch, substantially as described.

15. In a telephone system, the combination of a main wire having a switch at each telephone-station, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, means independent of said opening and closing for impelling said wheel, said wheels moving in unison but closing in succession, and the second closure being made by an independent switch, substantially as described.

16. In a telephone system, the combination of a main wire having a switch at each telephone-station, a return-wire, a bridge at each telephone-station between the main and return wires having therein the secondary winding and ear-phone, a break closed by the opening of the main line, and a second break and two closures for said break, one of said closures being made by a revolving wheel, all of said wheels being in unison but closing in succession and the other closure being made by means of an independent switch and means for preventing more than one of the series of said independent switches being closed at a time, substantially as described.

17. In a telephone system, the combination of a main wire having a switch at each telephone-station, a return-wire, a bridge at each telephone-station between the main and return wires having therein the secondary winding and ear-phone, a break closed by the opening of the main line, and a second break and two closures for said break, one of said closures being made by a revolving wheel, only one of such closures being operatable at a time for all the wheels and the second closure being made by an independent switch, and means for preventing more than one of the series of said independent switches being closed at a time, substantially as described.

18. In a telephone system, the combination of a main wire having a switch at each telephone-station, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line and the second closure being made by an independent switch, and means for preventing more than one of the series of said independent switches being closed at a time, substantially as described.

19. In a telephone system, the combination of a main wire having a switch at each telephone-station, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, means independent of said opening and closing for impelling said wheel, and the second closure being made by an independent switch, and means for preventing more than one of the series of said independent switches being closed at a time, substantially as described.

20. In a telephone system, the combination of a main wire having a switch at each telephone-station, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, only one of said wheels making a closure at a time, and the second closure being made by an independent switch, and means for preventing more than one of the series of said independent switches being closed at a time, substantially as described.

21. In a telephone system, the combination of a main wire having a switch at each telephone-station, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, means independent of said opening and closing for impelling said wheel, only one of said wheels making a closure at a time, and the second closure being by an independent switch, and means for preventing more than one of the series of said independent switches being closed at a time, substantially as described.

22. In a telephone system, the combination of a main wire having a switch at each telephone-station, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, means independent of said opening and closing for impelling said wheel, said wheels moving in unison but closing in succession, and the second closure being made by an independent switch, and means for preventing more than one of the series of said independent switches being closed at a time, substantially as described.

23. In a telephone system, the combination of a main wire having a switch at each telephone-station, a return-wire, a bridge at each telephone-station between the main and return wires having therein the secondary winding and ear-phone, a break closed by the opening of the main line, and a second break and two closures for said break, one of said closures being made by a revolving wheel, all of said wheels moving in unison but closing in succession and the other closure being made by the opening of the switch on the main wire, substantially as described.

24. In a telephone system, the combination of a main wire having a switch at each telephone-station, a return-wire, a bridge at each telephone-station between the main and return wires having therein the secondary winding and ear-phone, a break closed by the opening of the main line, and a second break and two closures for said break, one of said closures being made by a revolving wheel, only one of such closures being operatable at a time for all the wheels and the second closure being made by the opening of the switch on the main wire, substantially as described.

25. In a telephone system, the combination of a main wire having a switch at each telephone-station, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line and the second closure being made by the opening of the switch on the main wire, substantially as described.

26. In a telephone system, the combination of a main wire having a switch at each telephone-station, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, means independent of said opening and closing for impelling said wheel, and the second closure being made by the opening of the switch on the main wire, substantially as described.

27. In a telephone system, the combination of a main wire having a switch at each telephone-station, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, only one of said wheels making a closure at a time, and the second closure being made by the opening of the switch on the main wire, substantially as described.

28. In a telephone system, the combination of a main wire having a switch at each telephone-station, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, means independent of said opening and closing for impelling said wheel, only one of said wheels making a closure at a time, and a second closure being made by the opening of the switch on the main wire, substantially as described.

29. In a telephone system, the combination of a main wire having a switch at each telephone-station, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, means independent of said opening and closing for impelling said wheel, said wheels moving in unison but closing in succession, and the second closure being made by the opening of the switch on the main wire, substantially as described.

30. In a telephone system, the combination of a main wire having a switch at each telephone-station, a return-wire, a bridge at each telephone-station between the main and return wires having therein the secondary winding and ear-phone, a break closed by the opening of the main line, and a second break and two closures for said break, one of said closures being made by a revolving wheel, all of said wheels moving in unison but closing in succession and the other closure being made by means of an independent switch, and means for preventing the closure of the latter switch more than once for each complete revolution of the wheel, substantially as described.

31. In a telephone system, the combination of a main wire having a switch at each telephone-station, a return-wire, a bridge at each telephone-station between the main and return wires having therein the secondary winding and ear-phone, a break closed by the opening in the main line, and a second break and two closures for said break, one of said closures being made by a revolving wheel, only one of such closures being operatable at a time for all the wheels and the second closure being made by an independent switch, and means for preventing the closure of the latter switch more than once for each complete revolution of the wheel, substantially as described.

32. In a telephone system, the combination of a main wire having a switch at each telephone-station, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line and the second closure being made by an independent switch, and means for preventing the closure of the latter switch more than once for each complete revolution of the wheel, substantially as described.

33. In a telephone system, the combination of a main wire having a switch at each telephone-station, a return-wire, a bridge at each telephone-station between the main and return wires having therein the secondary and ear-phone, a break closed by the opening o the main line, and a second break and two closures for said break, one of said closures being made by a revolving wheel, the revolution being controlled by the opening and closing of the main line, means independent of said opening and closing for impelling said wheel, and the second closure being made by an independent switch, and means for preventing the closure of the latter switch more than once for each complete revolution of the wheel, substantially as described.

34. In a telephone system, the combination of a main wire having a switch at each telephone-station, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, only one of said wheels making a closure at a time, and the second closure being made by an independent switch, and means for preventing the closure of the latter switch more than once for each complete revolution of the wheel, substantially as described.

35. In a telephone system, the combination of a main wire having a switch at each telephone-station, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, means independent of said opening and closing for impelling said wheel, only one of said wheels making a closure at a time, and the second closure being by an independent switch, and means for preventing the closure of the latter switch more than once for each complete revolution of the wheel, substantially as described.

36. In a telephone system, the combination of a main wire having a switch at each telephone-station, a return-wire, a bridge at each telephone-station between the main and return wires having therein the secondary and ear-phone, a break closed by the opening of the main line, and a second break and two closures for each break, one of said closures being made by a revolving wheel, the revolution being controlled by the opening and closing of the main line, means independent of said opening and closing for impelling said wheel, said wheels moving in unison but closing in succession, and the second closure being made by an independent switch, and means for preventing the closure of the latter switch more than once for each complete revolution of the wheel, substantially as described.

37. In a telephone system, the combination of a main wire having a switch at each telephone-station, a shunt around said switch, a switch in said shunt, a return-wire, a bridge at each telephone-station between the main and return wires having therein the secondary winding and ear-phone, a break closed by the opening of the main line, and a second break and two closures for said break, one of said closures being made by a revolving wheel, all of said wheels moving in unison but closing in succession and the other closure being made by means of an independent switch, substantially as described.

38. In a telephone system, the combination of a main wire having a switch at each telephone-station, a shunt around said switch, a switch in said shunt, a return-wire, a bridge at each telephone-station between the main and return wires having therein the secondary winding and ear-phone, a break closed by the opening of the main line, and a second break and two closures for said break, one of said closures being made by a revolving wheel, only one of such closures being operatable at a time for all the wheels and the second closure being made by an independent switch, substantially as described.

39. In a telephone system, the combination of a main wire having a switch at each telephone-station, a shunt around said switch, a switch in said shunt, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line and the second closure being made by an independent switch, substantially as described.

40. In a telephone system, the combination of a main wire having a switch at each telephone-station, a shunt around said switch, a switch in said shunt, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, means independent of said opening and closing for impelling said wheel, and the second closure being made by an independent switch, substantially as described.

41. In a telephone system, the combination of a main wire having a switch at each telephone-station, a shunt around said switch, a switch in said shunt, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, only one of said wheels making a closure at a time, and the second closure being made by an independent switch, substantially as described.

42. In a telephone system, the combination of a main wire having a switch at each telephone-station, a shunt around said switch, a switch in said shunt, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, means independent of said opening and closing for impelling said wheel, only one of said wheels making a closure at a time, and the second closure being by an independent switch, substantially as described.

43. In a telephone system, the combination of a main wire having a switch at each telephone-station, a shunt around said switch, a switch in said shunt, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, means independent of said opening and closing for impelling said wheel, said wheels moving in unison but closing in succession, and the second closure being made by an independent switch, substantially as described.

44. In a telephone system, the combination of a main wire having a switch at each telephone-station, a shunt around said switch, a switch in said shunt, a return-wire, a bridge at each telephone-station between the main and return wires having therein the secondary winding and ear-phone, a break closed by the opening of the main line, and a second break and two closures for said break, one of said closures being made by a revolving wheel, all of said wheels being in unison but closing in succession and the other closure being made by means of an independent switch and means for preventing more than one of the series of said independent switches being closed at a time, substantially as described.

45. In a telephone system, the combination of a main wire having a switch at each telephone-station, a shunt around said switch, a switch in said shunt, a return-wire, a bridge at each telephone-station, between the main and return wires having therein the secondary winding and ear-phone, a break closed by the opening of the main line, and a second break and two closures for said break, one of said closures being made by a revolving wheel, only one of such closures being operatable at a time for all the wheels and the second closure being made by an independent switch, and means for preventing more than one of the series of said independent switches being closed at a time, substantially as described.

46. In a telephone system, the combination of a main wire having a switch at each telephone-station, a shunt around said switch, a switch in said shunt, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line and the second closure being made by an independent switch, and means for preventing more than one of the series of said independent switches being closed at a time, substantially as described.

47. In a telephone system, the combination of a main wire having a switch at each telephone-station, a shunt around said switch, a switch in said shunt, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, means independent of said opening and closing for impelling said wheel, and the second closure being made by an independent switch, and means preventing more than one of the series of said independent switches being closed at a time, substantially as described.

48. In a telephone system, the combination of a main wire having a switch at each telephone-station, a shunt around said switch, a switch in said shunt, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, only one of said wheels making a closure at a time, and the second closure being made by an independent switch, and means for preventing more than one of the series of said independent switches being closed at a time, substantially as described.

49. In a telephone system, the combination of a main wire having a switch at each telephone-station, a shunt around said switch, a switch in said shunt, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, means independent of said opening and closing for impelling said wheel, only one of said wheels making a closure at a time, and the second closure being made by an independent switch, and means for preventing more than one of the series of said independent switches being closed at a time, substantially as described.

50. In a telephone system, the combination of a main wire having a switch at each telephone-station, a shunt around said switch, a switch in said shunt, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, means independent of said opening and closing impelling said wheel, said wheels moving in unison but closing in succession, and means for preventing more than one of the series of said independent switches being closed at a time, substantially as described.

51. In a telephone system, the combination of a main wire having a switch at each telephone-station, a shunt around said switch, a switch in said shunt, a return-wire, a bridge at each telephone-station between the main and return wires having therein the secondary winding and ear-phone, a break closed by the opening of the main line, and a second break and two closures for said break, one of said closures being made by a revolving wheel, all of said wheels moving in unison but closing in succession and the other closure being made by the opening of the switch on the main wire, substantially as described.

52. In a telephone system, the combination of a main wire having a switch at each telephone-station, a shunt around said switch, a switch in said shunt, a return-wire, a bridge at each telephone-station between the main and return wires having therein the secondary winding and ear-phone, a break closed by the opening of the main line, and a second break and two closures for said break, one of said closures being made by a revolving wheel, only one of such closures being operatable at a time for all the wheels and the second closure being made by the opening of the switch on the main wire, substantially as described.

53. In a telephone system, the combination of a main wire having a switch at each telephone-station, a shunt around said switch, a switch in said shunt, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line and the second closure being made by the opening of the switch on the main wire, substantially as described.

54. In a telephone system, the combination of a main wire having a switch at each telephone-station, a shunt around said switch, a switch in said shunt, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, means independent of said opening and closing for impelling said wheel, and the second closure being made by the opening of the switch on the main wire, substantially as described.

55. In a telephone system, the combination of a main wire having a switch at each telephone-station, a shunt around said switch, a switch in said shunt, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, only one of said wheels making a closure at a time, and the second closure being made by the opening of the switch on the main wire, substantially as described.

56. In a telephone system, the combination of a main wire having a switch at each telephone-station, a shunt around said switch, a switch in said shunt, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, means independent of said opening and closing for impelling said wheel, only one of said wheels making a closure at a time, and the second closure being by the opening of the switch on the main wire, substantially as described.

57. In a telephone system, the combination of a main wire having a switch at each telephone-station, a shunt around said switch, a switch in said shunt, a return-wire, a bridge at each telephone-station between the main and return wires having therein the secondary and ear-phone, a break closed by the opening of the main line, and a second break and two closures for said break, one of said closures being made by a revolving wheel, the revolution being controlled by the opening and closing of the main line, means independent of said opening and closing for impelling said wheel, said wheels moving in unison but closing in succession, and the second closure being made by the opening of the switch on the main wire, substantially as described.

58. In a telephone system, the combination of a main wire having a switch at each telephone-station, a shunt around said switch, a switch in said shunt, a return-wire, a bridge at each telephone-station between the main and return wires having therein the secondary winding and ear-phone, a break closed by the opening of the main line, and a second break and two closures for said break, one of said closures being made by a revolving wheel, all of said wheels moving in unison but closing in succession and the other closure being made by means of an independent switch, and means for preventing the closure of the latter switch more than once for each complete revolution of the wheel, substantially as described.

59. In a telephone system, the combination of a main wire having a switch at each telephone-station, a shunt around said switch, a switch in said shunt, a return-wire, a bridge at each telephone-station between the main and return wires having therein the secondary winding and ear-phone, a break closed by the opening of the main line, and a second break and two closures for said break, one of said closures being made by a revolving wheel, only one of such closures being operatable at a time for all the wheels and the second closure being made by an independent switch, and means for preventing the closure of the latter switch more than once for each complete revolution of the wheel, substantially as described.

60. In a telephone system, the combination of a main wire having a switch at each telephone-station, a shunt around said switch, a switch in said shunt, a return-wire, a bridge at each telephone-station between the main and return wires having therein the secondary winding and ear-phone, a break closed by the opening of the main line, and a second break and two closures for said break, one of said closures being made by a revolving wheel, the revolution being controlled by the opening and closing of the main line and the second closure being made by an independent switch, and means for preventing the closure of the latter switch more than once for each complete revolution of the wheel, substantially as described.

61. In a telephone system, the combination of a main wire having a switch at each telephone-station, a shunt around said switch, a switch in said shunt, a return-wire, a bridge at each telephone-station between the main and return wires having therein the secondary winding and ear-phone, a break closed by the opening of the main line, and a second break and two closures for said break, one of said closures being made by a revolving wheel, the revolution being controlled by the opening and closing of the main line, means independent of said opening and closing for impelling said wheel. and the second closure being made by an independent switch, and means for preventing the closure of the latter switch more than once for each complete revolution of the wheel, substantially as described.

62. In a telephone system, the combination of a main wire having a switch at each telephone-station, a shunt around said switch, a switch in said shunt, a return-wire, a bridge at each telephone-station between the main and return wires having therein the secondary winding and ear-phone, a break closed by the opening of the main line, and a second break and two closures for said break, one of said closures being made by a revolving wheel, the revolution being controlled by the opening and closing of the main line, only one of said wheels making a closure at a time, and the second closure being made by an independent switch, and means for preventing the closure of the latter switch more than once for each complete revolution of the wheel, substantially as described.

63. In a telephone system, the combination of a main wire having a switch at each telephone-station, a shunt around said switch, a switch in said shunt, a return-wire, a bridge at each telephone-station between the main and return wires having therein the secondary winding and ear-phone, a break closed by the opening of the main line, and a second break and two closures for said break, one of said closures being made by a revolving wheel, the revolution being controlled by the opening and closing of the main line, means independent of said opening and closing for impelling said wheel, only one of said wheels making a closure at a time, and the second closure being an independent switch, and means for preventing the closure of the latter switch more than once for each complete revolution of the wheel, substantially as described.

64. In a telephone system, the combination of a main wire having a switch at each telephone-station, a shunt around said switch, a switch in said shunt, a return-wire, a bridge at each telephone-station between the main and return wires having therein the secondary winding and ear-phone, a break closed by the opening of the main line, and a second break and two closures for each break, one of said closures being made by a revolving wheel, the revolution being controlled by the opening and closing of the main line, means independent of said opening and closing for impelling said wheel, said wheels moving in unison but closing in succession, and the second closure being made by an independent switch, and means for preventing the closure of the latter switch more than once for each complete revolution of the wheel, substantially as described.

65. In combination with a main wire and a return-wire, a series of telephones distributed therealong, each telephone comprising a line bridging the main wire and the return-wire and containing the receiver and the secondary winding of the induction-coil, containing also a condenser, and having a break arranged to be closed by the opening of the main wire, said main wire having a relay for opening said break, a branch shunting said relay and containing a condenser, and means for breaking the main wire at any telephone, substantially as described.

66. In combination with a main wire, and a return-wire, a series of telephones distributed therealong, each telephone comprising a line bridging the main wire and the return-wire and containing the receiver and the secondary winding of the induction-coil, containing also a condenser, and having a break arranged to be closed by the opening of the main wire, said main wire having a relay for opening said break, a branch shunting said relay and containing a condenser, means for breaking the main wire at any telephone, and a shunt for said means containing additional means for breaking and closing said main wire, substantially as described.

67. In a telephone system, the combination of a main wire and a return-wire or the earth, of a series of telephones distributed along the main wire, each telephone being on a bridge between the main wire and the return-wire or earth, said bridge being normally disconnected from the main wire, and means for breaking the main wire and connecting the bridge thereto, said bridge comprising the secondary induction-coil and receiver, and means operatable at the station where said main wire has been so broken for connecting the bridge at any other desired station with the main wire, substantially as described.

68. In a telephone system, the combination of a main wire and a return-wire or the earth, of a series of telephones distributed along the main wire, each telephone being on a bridge between the main wire and the return-wire or earth, said bridge being normally disconnected from the main wire, and means for breaking the main wire and connecting the bridge thereto said bridge comprising the secondary induction-coil and receiver, and means operatable at the station where said main wire has been so broken for connecting the bridge at any other desired station with the main wire, and shunts on the main wire for each of the intervening telephones, substantially as described.

69. In a telephone system, the combination of a main wire and a return-wire or the earth, of a series of telephones distributed along the main wire, each telephone being on a bridge between the main wire and the return-wire or earth, said bridge being normally disconnected from the main wire, and means for breaking the main wire and connecting the bridge thereto, said bridge comprising the secondary induction-coil and receiver, and a condenser, and means operatable at the station where said main wire has been so broken for connecting the bridge at any other desired station with the main wire, substantially as described.

70. In a telephone system, the combination of a main wire and a return-wire or the earth, a series of telephones distributed therealong, each telephone having a bridge between the main wire and the return-wire having a break closed by the removal of the ear-phone from its hook, a local battery, the circuit of which has two branches, one of which contains the bell and the other the transmitter and primary winding, the former branch being closed and the latter being broken when the ear-phone is on its hook and the latter being closed and the former broken when the ear-phone is removed, and means operatable in any telephone of the system for breaking the main wire and connecting the bridge thereto, the breaking of the main wire operating to prevent such break being made at any other station in the system, substantially as described.

71. In a telephone system, the combination of a main wire, a return-wire, a series of telephones distributed along the main wire comprising a bridge between the main and the return wire normally disconnected from the main wire, a break in the main wire normally closed at each station, means operatable at any station in the system for opening said break and thereby preventing the opening of the remainder of such breaks in the system a shunt for the main wire around said break containing an auxiliary break or shunt, and synchronously-moving devices at all the stations for successively connecting the bridges of the main wire, said devices moving when the main circuit is open and stopping when the main circuit is closed whereby the closure of the shunt-break at any desired point of advance of said synchronously-moving devices closes the corresponding bridge and brings the desired telephone into the circuit, substantially as described.

72. In a telephone system, in combination with the main line, a series of telephone mechanisms thereon, each mechanism comprising an ear-phone, contact-springs normally closing the main line, a device for separating said contact-springs when the ear-phone is removed from the hook, a spring-actuated and suitably-controlled rotary wheel, the wheels of all the mechanisms being arranged to rotate in unison, said wheels at a certain point in their movement actuating said devices to bring them into position to separate the contact-springs of all the ear-phones, and means whereby when any ear-phone has been removed from the hook and the corresponding contact-springs have been so separated, the devices of all the mechanisms of the system are shifted out of their relative position to separate said springs whereby the signaling party has the uninterrupted control of the line, substantially as described.

73. In a telephone system, the combination with the main line of a series of telephone mechanisms therefor, each mechanism comprising a rotating wheel, means independent of the continuity of the electric circuit whereby said wheels of all the mechanisms may be made to rotate in unison, means for arresting all the wheels at a corresponding point of rotation thereof, said wheels only when so arrested being in position to coöperate with a device for breaking the circuit, and a device in each mechanism coöperating with the device for breaking the circuit thereat, said coöperating device being operatable by the signaling party, and means whereby, on the operation of said latter device, the circuit is broken and the wheels are free to advance, whereby the signaling party has the only break on the line for the insertion of a telephone, substantially as described.

74. A telephone system comprising a main line having at each station therealong a normally closed break, a signaling-circuit having a break therein, a device for closing said break, said devices all moving in unison, but operating to exclusively close the breaks in succession, means for moving said devices, operative when the main line is closed but inoperative when it is open, and means for opening any of the said breaks in the line and thereby preventing the opening of any other of said breaks, whereby control of the line is had at the break so opened, substantially as described.

75. A telephone system comprising a main line having a break at each station arranged to be opened by the removal of the ear-phone from its hook, synchronously-moving contact-changers at the respective stations controlled by the opening and closing of the main line, and a loop-line with switch, inserted in each break so made, for so controlling said changers, substantially as described.

76. A telephone system comprising a main line having a break at each station arranged to be opened by the removal of the ear-phone from its hook, synchronously-moving contact-changers partly closing in succession and exclusively a series of branch lines at the respective stations controlled by the opening and closing of the main line at said break, means, operatable at said break, for further closing said lines simultaneously, and means actuated by the removal from its hook of the ear-phone of the party whose branch line is so exclusively partly closed, for completely closing said branch line, substantially as described.

77. A telephone system comprising a main line having a break at each station arranged to be opened by the removal of the ear-phone from its hook, synchronously-moving contact-changers caused to move a short distance only from their zero position upon the breaking of the main line, means whereby the closing of the main line again starts said contact-changers, said contact-changers partly closing in succession and exclusively the talking-circuits at the several stations, and means whereby the removal of the selected party's ear-phone from its hook completely closes said talking-circuit, substantially as described.

78. A telephone system comprising a main line having a break at each station arranged to be opened by the removal of the ear-phone from its hook, synchronously-moving contact-changers caused to move a short distance only from their zero position upon the breaking of the main line, means whereby the closing of the main line again starts said contact-changers, said contact-changers partly closing in succession and exclusively the talking-circuits at the several stations, and means whereby the removal of the selected party's ear-phone from its hook completely closes said talking-circuit, and also the primary transmitter-circuit, substantially as described.

79. A telephone system comprising a main line having a break at each station arranged to be opened by the removal of the ear-phone from its hook, synchronously-moving contact-changers caused to move a short distance only from their zero position upon the breaking of the main line, means whereby the closing of the main line again starts said contact-changers, said contact-changers partly closing in succession and exclusively the talking-circuits at the several stations, means whereby the breaking of the main circuit further partly closes the talking-circuit, and means whereby the removal of the selected party's ear-phone from its hook completely closes said talking-circuit, substantially as described.

80. A telephone system comprising a main line having a break at each station arranged to be opened by the removal of the ear-phone from its hook, synchronously-moving contact-changers caused to move a short distance only from their zero position upon the breaking of the main line, means whereby the closing of the main line again starts said contact-changers, said contact-changers partly closing in succession and exclusively the bell-circuits of the several stations, and means whereby the breaking of the main circuit completely closes a selected bell-circuit, substantially as described.

81. A telephone system comprising a main line having a break at each station arranged to be opened by the removal of the ear-phone from its hook, synchronously-moving contact-changers caused to move a short distance only from their zero position upon the breaking of the main line, means whereby the closing of the main line again starts said contact-changers, said contact-changers partly closing in succession and exclusively the bell-circuits of the several stations, and means whereby the breaking of the main circuit completely closes a selected bell-circuit, means under the control of the signaling party for partly closing the talking-circuit of the selected party, and means whereby the removal of the latter party's ear-phone from its hook breaks his bell-circuit and closes his talking-circuit, substantially as described.

82. A telephone system comprising a main line having a break at each station arranged to be opened by the removal of the ear-phone from its hook, synchronously-moving contact-changers caused to move a short distance only from their zero position upon the breaking of the main line, means whereby the closing of the main line again starts said contact-changers, said contact-changers partly closing in succession and exclusively the bell-circuits of the several stations, and means whereby the breaking of the main circuit completely closes a selected bell-circuit, means under the control of the signaling party for partly closing the talking-circuit of the selected party, and means whereby the removal of the latter party's ear-phone from its hook breaks his bell-circuit and closes his talking-circuit and primary transmitter-circuit, substantially as described.

83. A telephone system comprising a main line having a break at each station arranged to be opened by the removal of the ear-phone from its hook, synchronously-moving contact-changers controlled by the opening and closing of the main circuit, said contact-changers partly closing in succession and exclusively the talking-circuits at the several stations, means whereby the breaking of the main circuit further partly closes the talking-circuits, and means whereby the removal of the called subscriber's ear-phone from its hook completely closes his talking-circuit, substantially as described.

84. A telephone system comprising a main line having a break at each station arranged to be opened by the removal of the ear-phone from its hook, synchronously-moving contact-changers controlled by the opening and closing of the main circuit, said contact-changers partly closing in succession and exclusively the talking-circuits at the several stations, means whereby the breaking of the main circuit further partly closes the talking-circuits, and means whereby the removal of the called subscriber's ear-phone from its hook completely closes his talking-circuit and primary transmitter-circuit, substantially as described.

85. A telephone system comprising a main line having a break at each station arranged to be opened by the removal of the ear-phone from its hook, synchronously-moving contact-changers controlled by the opening and closing of the main circuit, said contact-changers partly closing in succession and exclusively the bell-circuits of the several stations, means whereby the breaking of the main circuit completely closes the selected bell-circuit and means whereby the removal of the called subscriber's ear-phone from its hook breaks his bell-circuit, substantially as described.

86. A telephone system comprising a main line having a break at each station arranged to be opened by the removal of the ear-phone from its hook, synchronously-moving contact-changers controlled by the opening and closing of the main circuit, said contact-changers partly closing in succession and exclusively the bell-circuits of the several stations, means whereby the breaking of the main circuit completely closes the selected bell-circuit, means whereby the removal of the called subscriber's ear-phone from its hook breaks his bell-circuit, means operatable by the calling subscriber for partly closing the signaled party's talking-circuit and means whereby the removal of the latter's ear-phone from his hook completely closes said talking-circuit, substantially as described.

87. A telephone system comprising a main line having a break at each station arranged to be opened by the removal of the ear-phone from its hook, synchronously-moving contact-changers at the respective stations controlled by the opening and closing of the main line, said contact-changers partly closing in succession and exclusively the bell-circuits and talking-circuits, at the remaining stations, means whereby the breaking of the main circuit completely closes the bell-circuit then partly closed by the contact-changer and further closes the corresponding talking-circuit, and means whereby the removal of the corresponding phone from its hook breaks said bell-circuit and closes the corresponding talking-circuit, substantially as described.

88. A telephone system comprising a main line having a break at each station arranged to be opened by the removal of the ear-phone from its hook, synchronously-moving contact-changers at the respective stations controlled by the opening and closing of the main line, said contact-changers partly closing in succession and exclusively the bell-circuits and talking-circuits, at the remaining stations, means whereby the breaking of the main circuit completely closes the bell-circuit then partly closed by the contact-changer and further closes the corresponding talking-circuit, and means whereby the removal of the corresponding phone from its hook breaks said bell-circuit and closes the corresponding talking-circuit and also the primary transmitter-circuit, substantially as described.

89. A telephone system comprising synchronously-moving contact-changers at the respective stations, means whereby the breaking of the main circuit permits said contact-changers to advance a short distance, but immediately afterward arrests them, means whereby the closing of said circuit again starts said changers, said changers partly closing in succession and exclusively the bell-circuits of the system, means whereby the breaking of the main circuit completely closes the bell-circuit then partly closed, and means for closing the corresponding talking-circuit, substantially as described.

90. A telephone system comprising synchronously-moving contact-changers at the respective stations, means whereby the breaking of the main circuit permits said contact-changers to advance a short distance, but immediately afterward arrests them, means whereby the closing of said circuit again starts said changers, said contact-changers partly closing in succession and exclusively the talking-circuits of the system, means whereby the breaking of the main circuit further closes the selected talking-circuit then thus partly closed, and means whereby the removal of the corresponding ear-phone from its hook completely closes said talking-circuit, substantially as described.

91. A telephone system comprising synchronously-moving contact-changers at the respective stations, means whereby the breaking of the main circuit permits said contact-changers to advance a short distance, but immediately afterward arrests them, means whereby the closing of said circuit again starts said changers, said contact-changers partly closing in succession and exclusively bell-circuits and talking-circuits of the system, means whereby the breaking of the main circuit at any time completely closes the bell-circuit then thus partly closed and further partly closes the talking-circuit then thus partly closed, and means whereby the removal of the corresponding ear-phone from its hook breaks the bell-circuit and closes the talking-circuit, substantially as described.

92. A telephone system comprising a series of contact-changers at the respective stations, means whereby said changers are permitted to advance only when the main circuit is closed, said changers partly closing in succession and exclusively bell-circuits of the system, means whereby the breaking of the main circuit at any time completely closes the bell-circuit then thus partly closed, and means for closing the corresponding talking-circuit, substantially as described.

93. A telephone system comprising a series of contact-changers at the respective stations, means whereby said changers are permitted to advance only when the main circuit is closed, said contact-changers partly closing in succession and exclusively talking-circuits of the system, means whereby the breaking of the main circuit at any time still further partly closes the talking-circuit then thus partly closed, and simultaneously closes the corresponding bell-circuit, and means whereby the removal of the called subscriber's ear-phone from its hook completely closes said talking-circuit, substantially as described 94. A telephone system, comprising a series of contact-changers at the respective stations, means whereby said changers are permitted to advance only when the main circuit is closed, said contact-changers partly closing in succession and exclusively bell-circuits and talking-circuit of the system, means whereby the breaking of the main circuit at any time completely closes the bell-circuit then partly closed and further partly closes the corresponding talking-circuit, and means whereby the removal of the called subscriber's ear-phone closes his talking-circuit, substantially as described.

95. A selective telephone system comprising in each telephone, clockwork, all the clockworks moving synchronously, a controller, a device moving with the clockwork, holding the controller in position to be actuated by the automatic hook, said automatic hook, means whereby the movement of the automatic hook starts the clockworks in all the telephones, and means whereby the starting of the clockwork in any telephone in which the controller was not so actuated renders said holding device inoperative, substantially as described.

96. A selective telephone system comprising, in each telephone, clockwork, all the clockworks moving synchronously, a controller, means operated from the outside of the telephone-box for actuating said controller, and for starting the clockwork in all the telephones, a device, moving with the clockwork holding the controller in position to be actuated by said means, and means whereby the starting of the clockwork in any other telephone in which the controller was not so actuated renders said holding device inoperative, substantially as described.

97. A selective telephone system comprising telephones each having clockwork mechanism, a wheel revolved thereby, a line-controller, a stud carried by said wheel engaging said line-controller, and means for starting the clockwork mechanism, the stud then being withdrawn from the controller, and the latter being inoperative, substantially as described.

98. In an apparatus of the character described, the combination of a line-controller, an automatic hook arranged when released to contact with said line-controller, and means operated by said contact for releasing all the other line-controllers of the system whereby no other automatic hook can contact with its corresponding line-controller, substantially as described.

99. In an apparatus of the character described, the combination of a line-controller, an automatic hook for the receiver, means operated by the release of said hook for actuating the line-controller to change the circuit and control the line, and means operated by said changing of the circuit for rendering all the other line-controllers unresponsive to the action of the corresponding automatic hook, substantially as described.

100. A telephone system comprising a series of telephones, each having a line-controller and a clockwork mechanism, said clockwork mechanisms moving in unison throughout the system, means whereby when the line is not in use any line-controller of the system may be actuated to permit the clockwork mechanisms to start, and means whereby such actuation of one controller renders the other controllers inoperative, substantially as described.

101. A telephone system comprising a series of telephones each having a clockwork mechanism and a line-controller, means whereby the taking down of the receiver in any telephone when the line is not in use actuates the corresponding line-controller and starts the clockwork mechanisms throughout the system, and means controlled by said line-controller when so actuated, for rendering the other controllers of the system inoperative, substantially as described.

102. A telephone system comprising a series of telephones, each having a clockwork mechanism, means whereby said mechanisms move in unison, means under the control of any party on the line when the line is not in use, for starting all of said clockwork mechanisms, means for automatically arresting said clockwork mechanisms after moving through a short distance, and selective means, operatable only by the party calling, for restarting said clockwork mechanisms and for stopping them at a predetermined point in their synchronous movement, substantially as described.

103. A selective telephone system, comprising telephones each having clockwork mechanism, a line-controller, a device moved by the clockwork mechanism engaging said line-controller, and means for starting the clockwork mechanism, the device then being withdrawn from the controller and the latter being inoperative, substantially as described.

104. In a selective telephone system, a line-controller at each station, means whereby the rise of the automatic hook operates the line-controller to influence the circuit, means for supporting the line-controller in a position to be so operated by the rise of the automatic hook, and means whereby the influencing of the circuit causes all the supporting means on the line to withdraw the controllers except the one already operated, out of position to be so operated by the rise in the corresponding automatic hook, substantially as described.

105. In a selective telephone system, a line-controller at each station, means whereby the rise of the automatic hook operates the line-controller to influence the circuit, means for supporting the line-controller in a position to be so operated by the rise of the automatic hook and means whereby the influencing of the circuit causes all the supporting means on the line to withdraw the controllers except the one already operated out of position to be so operated by the rise in the corresponding automatic hook, and a busy-signal brought into signaling position by such actuation of the supporting means, substantially as described.

In witness whereof we have hereunto set our hands in the presence of two subscribing witnesses.

NOBLE S. McKINSEY.
A. R. NELSON.

Witnesses:
L. R. CADY,
J. A. PARDU.